(12) United States Patent
Chen et al.

(10) Patent No.: US 11,768,742 B2
(45) Date of Patent: *Sep. 26, 2023

(54) DATA STORAGE DEVICE AND METHOD FOR MAINTAINING NORMAL BOOT OPERATION OF DATA STORAGE DEVICE

(71) Applicant: INNODISK CORPORATION, New Taipei (TW)

(72) Inventors: Ming-Sheng Chen, New Taipei (TW); Chih-Ching Wu, New Taipei (TW); Chin-Chung Kuo, New Taipei (TW)

(73) Assignee: Innodisk Corporation, New Taipei (TW)

( * ) Notice: Subject to any disclaimer, the term of this patent is extended or adjusted under 35 U.S.C. 154(b) by 114 days.

This patent is subject to a terminal disclaimer.

(21) Appl. No.: 17/474,386

(22) Filed: Sep. 14, 2021

(65) Prior Publication Data

US 2022/0179755 A1    Jun. 9, 2022

(30) Foreign Application Priority Data

Dec. 3, 2020   (TW) ................................. 109142593

(51) Int. Cl.
*G06F 11/00* (2006.01)
*G06F 11/14* (2006.01)

(52) U.S. Cl.
CPC ...... *G06F 11/1469* (2013.01); *G06F 11/1417* (2013.01); *G06F 11/1451* (2013.01); *G06F 11/1464* (2013.01)

(58) Field of Classification Search
CPC ............ G06F 11/1469; G06F 11/1417; G06F 11/1451; G06F 11/1464; G06F 11/1446

USPC ........................................ 714/763, 769, 773
See application file for complete search history.

(56) References Cited

U.S. PATENT DOCUMENTS

| | | | |
|---|---|---|---|
| 10,740,468 B2* | 8/2020 | Shivanna | G06F 21/577 |
| 2008/0168244 A1* | 7/2008 | Chu Chen | G06T 1/60 |
| | | | 711/E12.028 |
| 2010/0070800 A1* | 3/2010 | Hanna | G06F 21/575 |
| | | | 714/E11.133 |
| 2010/0185842 A1* | 7/2010 | Yu | G06F 11/1417 |
| | | | 713/2 |
| 2013/0103937 A1 | 4/2013 | Kumagai | |

(Continued)

FOREIGN PATENT DOCUMENTS

CN        111522690 A        8/2020

*Primary Examiner* — Albert Decady
*Assistant Examiner* — Osman M Alshack
(74) *Attorney, Agent, or Firm* — Rosenberg, Klein & Lee (57) ABSTRACT

A data storage device is disclosed. The data storage device comprises a controller and a data storage unit. The controller comprises a firmware. The data storage unit comprises a first system storage sector and a second system storage sector. A state of the first system storage sector is preset as a display state by the firmware, and a state of the second system storage sector is preset as a hidden state by the firmware. The first system storage sector stores an original operating system, and the second system storage sector stores a backup operating system. When the original operating system damages, the firmware will recover the original operating system in the first system storage sector via the backup operating system in the second system storage sector; afterwards, a boot operation can be executed via the original operating system recovered, again.

6 Claims, 6 Drawing Sheets

(56) References Cited

U.S. PATENT DOCUMENTS

| | | | | |
|---|---|---|---|---|
| 2015/0026538 A1* | 1/2015 | Sakai | ............ | G11B 20/1833 |
| | | | | 714/764 |
| 2016/0154700 A1* | 6/2016 | Tian | ............ | G06F 11/1469 |
| | | | | 714/15 |
| 2020/0210295 A1* | 7/2020 | Lee | ............ | G06F 11/1458 |
| 2021/0286685 A1* | 9/2021 | Ali | ............ | G06F 11/0793 |
| 2021/0357298 A1* | 11/2021 | Jeansonne | ............ | G06F 11/1417 |
| 2022/0100489 A1* | 3/2022 | Hung | ............ | G06F 11/0757 |

* cited by examiner

DATA STORAGE DEVICE AND METHOD FOR MAINTAINING NORMAL BOOT OPERATION OF DATA STORAGE DEVICE

This non-provisional application claims priority claim under 35 U.S.C. § 119(a) on Taiwan Patent Application No. 109142593 filed Dec. 3, 2020, the entire contents of which are incorporated herein by reference.

FIELD OF THE INVENTION

The present invention relates to a method for maintaining normal boot operation of data storage device.

BACKGROUND

In the past, the computer manufacturer would store a system image file in a computer before the computer is shipped. When the operating system has damaged, an operating system recovery procedure is executed via the system image file, and executed in a miniaturized system. A data storage sector of a data storage device inside the computer is divided into a system sector and a backup sector. The system sector stores an operating system, and the backup sector stores the system image file and the miniaturized system (such as Windows PE).

When the user wants to execute the operating system recovery procedure, he can press a recovery button connected to a motherboard to trigger an operating system recovery function. After the operating system recovery function is triggered, BIOS of the computer executes a boot operation via the miniaturized system in the recovery sector. After the computer has booted, the system image file can be decompressed by the operation of the miniaturized system, and the operating system can be recovered via the system image file decompressed.

By the miniaturized system executing the operating system recovery procedure, the file format of the system image file and the version of the operating system must be able to be parsed by the miniaturized system or else the system image file cannot be decompressed such that the operating system cannot be recovered. Therefore, the operating system recovery procedure executed by the miniaturized system is usually suitable for using on a computer with an operating system of Microsoft Windows.

At present, most of the operating systems in industrial control equipments are adopting non-windows operating systems, such as Linux and TinyOS. If the operating system recovery procedure of the industrial control equipment is executed by the miniaturized system, the software structure of the miniaturized system must be redesigned according to the version of the operating system adopted by the industrial control equipment; else, the operating system recovery procedure of the industrial control equipment will not be completed smoothly. Accordingly, the redesigning of the miniaturized system will cause many troubles for software designers of industrial control equipment.

SUMMARY

It is one objective of the present invention to provide a data storage device, which can be disposed in an electronic apparatus, and comprises a controller and a data storage unit. The controller comprises a firmware. An operating system recovery procedure is defined in the firmware. The data storage unit comprises a first system storage sector and a second system storage sector. The first system storage sector stores an original operating system, and the second system storage sector stores a first backup operating system. The second system storage sector is an over provisioning sector of the data storage unit. The firmware of the controller presets a state of the first system storage sector as a display state, and presets a state of the second system storage sector as a hidden state. When the original operating system in the first system storage sector damages, the firmware of the controller executes the operating system recovery procedure to copy the first backup operating system in the second system storage sector to the first system storage sector by a means of copying the sector data such that the original operating system in the first system storage sector can be recovered. The original operating system is recovered by copying the sector data, it does not need to be parsed and recognized the architecture and version of the original operating system during the recovery procedure of the original operating system, so that the electronic apparatus adopting Microsoft Windows operating system or non-Microsoft Windows operating system (such as Linux or TinyOS) can both be performed the recovery of the operating system easily.

It is another objective of the present invention to provide a data storage device, in which the firmware of the controller further defines a boot pointer offset procedure. The firmware of the controller presets a boot pointer to point to a first initial sector address of the first system storage sector, and sets the first initial sector address as a master boot sector address. When the original operating system is operating normally, the firmware of the controller reads a master boot record from the first initial sector address, and executes a boot operation of the original operating system by the master boot record in the first initial sector address. When the original operating system damages and cannot boot smoothly, the firmware of the controller will execute the boot pointer offset procedure to offset the boot pointer from pointing to the first initial sector address of the first system storage sector to pointing to the second initial sector address of the second system storage sector. Then, the firmware of the controller converts the state of the first system storage sector from the display state to the hidden state and converts the state of the second system storage sector from the hidden state to the display state, reads a master boot record from the second initial sector address, and executes the boot operation of the first backup operating system by the master boot record in the second initial sector address. Accordingly, when the original operating system damages, the boot operation of the electronic apparatus can be restored quickly via the first backup operating system, and further the electronic apparatus may continue to execute the operations by the use of the first backup operating system.

It is another objective of the present invention to provide a data storage device, wherein the data storage unit further comprises a third system storage sector. The third system storage sector is also the over provisioning sector of the data storage unit, and stores a second backup operating system. A state of the third system storage sector is preset as a hidden state by the firmware of the controller. When the first backup operating system in the second system storage sector is operating, the firmware of the controller executes an operating system recovery procedure to recover the first operating system by the second backup operating system in the hidden third system storage sector, and executes the boot operation by the recovered operating system.

It is another objective of the present invention to provide a data storage device, wherein the system storage sector of the data storage unit for storing the backup operating system is an over provisioning sector. The over provisioning sector is a sector in a hidden state that cannot be operated by the user using the operating system or BIOS, so as to avoid the backup operating system from being tampered with or overwritten by other data.

To achieve the above objective, the present invention provides a data storage device, comprising: a controller comprising a firmware; and a data storage unit connected to the controller, the data storage unit comprising: a first system storage sector used to store an original operating system, wherein a state of the first system storage is preset as a display state by the firmware; and a second system storage sector used to store a backup operating system, wherein the second system storage sector is an over provisioning sector, and a state of the second system storage sector is preset as a hidden state by the firmware; wherein when the original operating system damages, the firmware of the controller recovers the original operating system in the first system storage sector via the backup operating system in the second system storage sector.

In one embodiment of the present invention, wherein the data storage device further comprises a data transmission interface connected to the controller; when the controller receives a triggering command via the data transmission interface, the firmware of the controller executes an operating system recovery procedure according to the triggering command, and recovers the original operating system in the first system storage sector via the backup operating system in the hidden second system storage sector.

In one embodiment of the present invention, wherein the controller is connected to an input and output port; when the input and output port is triggered, the firmware of the controller executes an operating system recovery procedure to recover the original operating system in the first system storage sector via the backup operating system in the hidden second system storage sector.

The present invention further provides a data storage device, comprising: a controller comprising a firmware; and a data storage unit connected to the controller, the data storage unit comprising: a first system storage sector, used to store an original operating system, and comprising a first initial sector address, wherein a state of the first system storage sector is preset as a display state by the firmware; and a second system storage sector, used to store a first backup operating system, and comprising a second initial sector address, wherein the second system storage sector is a first over provisioning sector of the data storage unit, and a state of the second system storage sector is preset as a hidden state by the firmware; wherein when the original operating system is normal, a boot pointer is set by the firmware to point to the first initial sector address of the first system storage sector, and then the original operating system executes a boot operation; when the original operating system damages, the firmware of the controller converts the state of the first system storage sector from the display state to the hidden state, converts the state of the second system storage sector from the hidden state to the display state, offsets the boot pointer from pointing to the first initial sector address to pointing to the second initial sector address, and executes the boot operation by the first backup operating system.

In one embodiment of the present invention, wherein the data storage device further comprises a data transmission interface connected to the controller; when the controller receives a triggering command via the data transmission interface, the firmware of the controller executes a boot pointer offset procedure to offset the boot pointer from pointing to the first initial sector address to pointing to the second initial sector address.

In one embodiment of the present invention, wherein the controller is connected to an input and output port; when the input and output port is triggered, the firmware of the controller executes a boot pointer offset procedure to offset the boot pointer from pointing to the first initial sector address to pointing to the second initial sector address.

In one embodiment of the present invention, wherein the data storage unit further comprises a third system storage sector that is a second over provisioning sector of the data storage unit, and stores a second backup operating system; a state of third system storage sector is preset as the hidden state by the firmware; when the first backup operating system finishes the boot operation and operates normally, the firmware of the controller recovers the original operating system in the first system storage sector by the second backup operating system in the hidden third system storage sector.

The present invention further provides a method for maintaining normal boot operation of data storage device, wherein the data storage device comprises a data storage unit and a controller; the controller comprises a firmware; the data storage unit comprises a first system storage sector and a second system storage sector; the first system storage sector stores an original operating system, and the second system storage sector is an over provisioning sector of the data storage unit, and stores a backup operating system; a state of the first system storage sector is preset as a display state by the firmware, and a state of the second system storage sector is preset as a hidden state by the firmware; the method executed by the firmware of the controller comprising: presetting a boot pointer to point to a first initial sector address of the first system storage sector to execute a boot operation via the original operating system in the first system storage sector; recovering the original operating system in the first system storage sector when the original operating system fails to boot up via the backup operating system in the hidden second system storage sector; and executing the boot operation via the recovered original operating system in the first system storage sector.

The present invention further provides a method for maintaining normal boot operation of data storage device, wherein the data storage device comprises a data storage unit and a controller; the controller comprises a firmware; the data storage unit comprises a first system storage sector and a second system storage sector; the first system storage sector stores an original operating system and comprises a first initial sector address; the second system storage sector is a first over provisioning sector of the data storage unit, stores a first backup operating system, and comprises a second initial sector address; a state of the first system storage sector is preset as a display state by the firmware of the controller, and a state of the second system storage sector is preset as a hidden state by the firmware of the controller; the method executed by the firmware of the controller comprising: presetting a boot pointer to point to a first initial sector address of the first system storage sector to execute a boot operation via the original operating system in the first system storage sector; offsetting the boot pointer from pointing to the first initial sector address to pointing to the second initial sector address when the original operating system damages; converting the state of the first system storage sector from the display state to the hidden state and converting the state of the second system storage sector from the hidden state to the display state; reading a master boot record from the second initial sector address of the second system storage sector; and executing the boot operation of the first backup operating system according to the master boot record read from the second initial sector address of the second system storage sector.

In one embodiment of the present invention, wherein the data storage unit further comprises a third system storage sector that is a second over provisioning sector of the data storage unit, and stores a second backup operating system; a state of the third system storage sector is preset as the hidden state by the firmware; when the first backup operating system finishes the boot operation and operates normally, the method executed by the firmware of the controller further comprising: recovering the original operating system in the first system storage sector by the second backup operating system in the hidden third system storage sector.

DETAILED DESCRIPTION OF THE PREFERRED EMBODIMENTS

Figure 1:
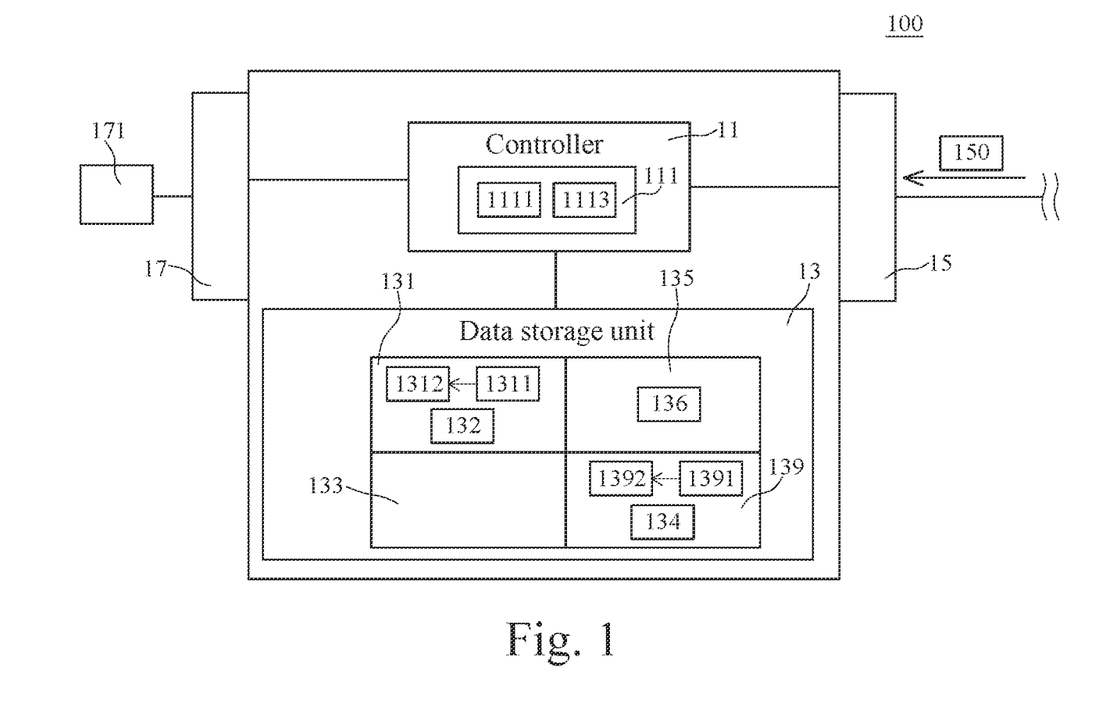
FIG. 1 is a structural view of a data storage device of the present invention.
Figure 2:
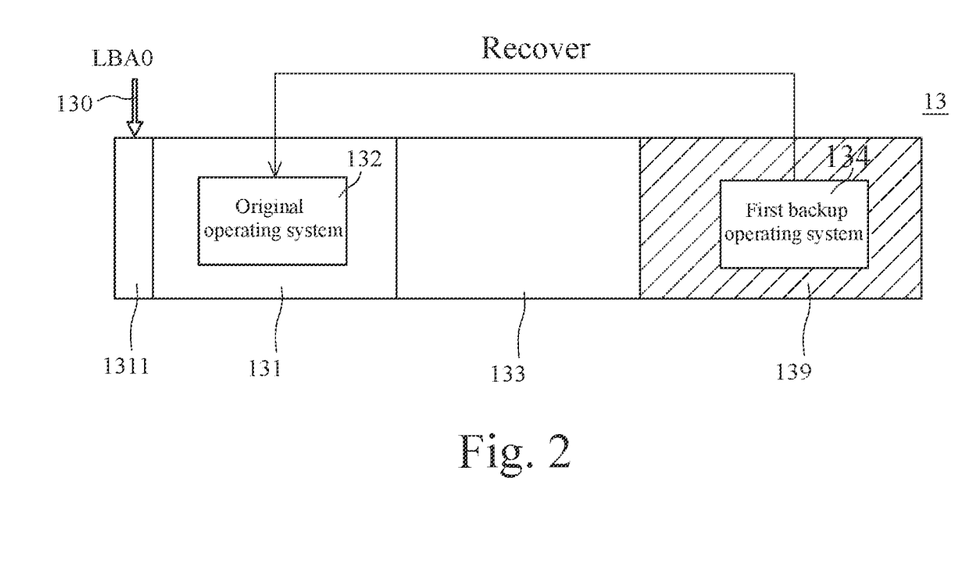
FIG. 2 is a schematic diagram of a data sector of a data storage unit of the data storage device according to one embodiment of the present invention.

Referring to FIG. 1 and FIG. 2, there are shown a structural view of a data storage device of the present invention, and a schematic diagram of a data sector of a data storage unit of the data storage device according to one embodiment of the present invention. As shown in FIG. 1, the data storage device 100 of the present invention may be a SSD (Solid State Disk), which is disposed in an electronic apparatus (such as a computer or an automation apparatus), and as a storage medium of the electronic apparatus. The data storage device 100 comprises a controller 11, a data storage unit 13, a data transmission interface 15, and an input and output port 17. The controller 11 is connected to the data storage unit 13, the data transmission interface 15, and the input and output port 17, respectively.

The controller 11 comprises a firmware 111. The data storage unit 13 comprises a plurality of flash memories, which are formed with a plurality of data sectors. As shown in FIG. 2, the data sectors of the data storage unit 13 are divided by the firmware 111 of the controller 11 into a first system storage sector 131, a data storage sector 133, and a second system storage sector 139. The first system storage sector 131 stores an original operating system 132. The data storage sector 133 stores general data. The second system storage sector 139 stores a first backup operating system 134.

A state of the first system storage sector 131 and a state of the data storage sector 133 are preset as a display state by the firmware 111, respectively. A state of the second system storage sector 139 is preset as a hidden state by the firmware 111. In the present invention, the sector in the hidden state is a physical storage space that is unable to be viewed by the operating system or BIOS via the logical block address. For example, the second system storage sector 139 is an over provisioning (OP) sector reserved by SSD manufacturer.

Furthermore, the first system storage sector 131 comprises a first initial sector address 1311. The data sector of the first initial sector address 1311 has a master boot record (MBR) 1312. In the present invention, a boot pointer 130 is preset by the firmware 111 of the controller 11 to point to the first initial sector address 1311 of the first system storage sector 131, and the first initial sector address 1311 is set by the firmware 111 of the controller 11 as a master boot sector address, for example, the zeroth logical block addressing (logical block addressing 0, LBA 0).

When the electronic apparatus is power on, the firmware 111 of the controller 11 enters the first system storage sector 131 of the data storage unit 13 according to the indication of the boot pointer 130, reads the master boot record 1312 from the first initial sector address 1311 of the first system storage sector 131, and executes a boot operation of the original operating system 132 by the master boot record 1312. After the original operating system 132 has booted normally, the electronic apparatus will perform the operations in the operating environment of the original operating system 132.

The firmware 111 of the controller 11 defines an operating system recovery procedure 1111. When the original operating system 132 has damaged and cannot boot smoothly, the firmware 111 of the controller 11 will execute the operating system recovery procedure 1111 to read the first backup operating system 134 from the second system storage sector 139 in the hidden state, and recover the original operating system 132 in the first system storage sector 131 by the first backup operating system 134. After the operating system recovery procedure 1111 is completed, the firmware 111 of the controller 11 executes the boot operation by the recovered original operating system 132 again, and then executes the operations of the electronic apparatus by the recovered original operating system 132.

The firmware 111 of the controller 11 of the present invention performs the recovery procedure of the original operating system 132 by a means of copying the sector data. For example, the firmware 111 of the controller 11 copies the data of the first backup operating system 134 stored in the data sector of the second system storage sector 139 to the first system storage sector 131 to recover the original operating system 132 in the first system storage sector 131. Accordingly, a version of the original operating system 132 does not need to be parsed and recognized during the recovery procedure of the original operating system 132, such that the electronic apparatus adopting Microsoft Windows operating system or non-Microsoft Windows operating system (such as Linux or TinyOS) can both be performed the recovery of the operating system easily.

In the present invention, the second system storage sector 139 is a sector in the hidden state that cannot be operated by the user using the operating system or BIOS so as to avoid the first backup operating system 134 from being tampered with or overwritten by other data.

Figure 3:
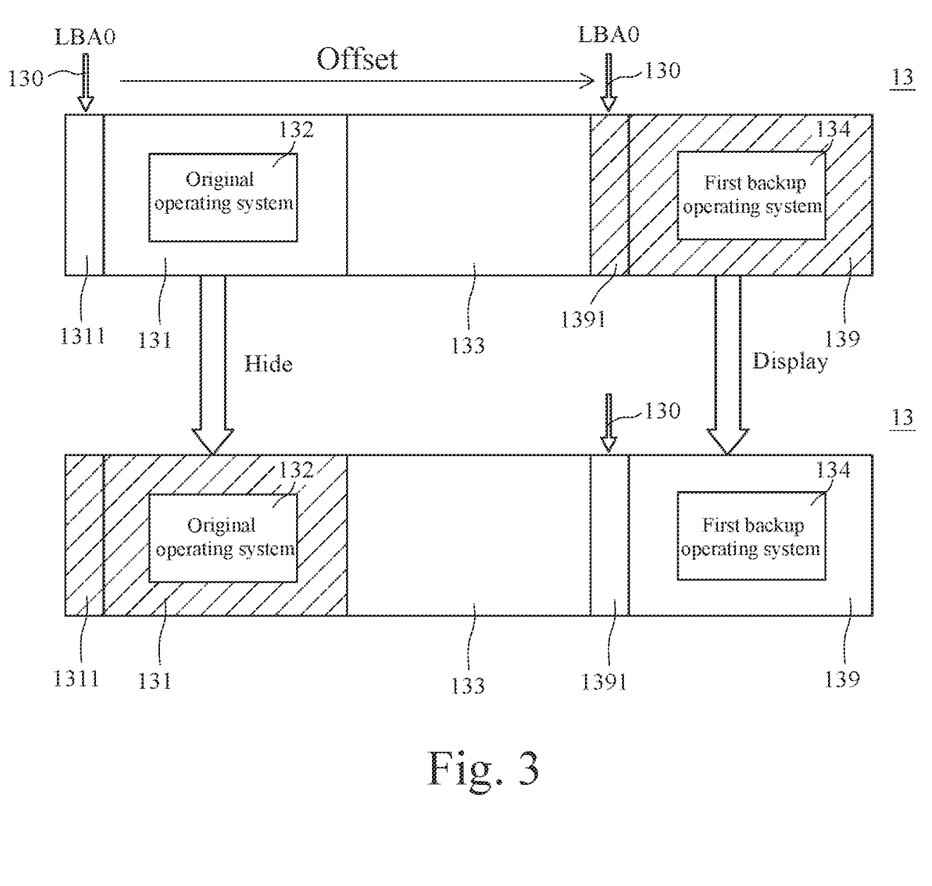
FIG. 3 is a schematic diagram of the data sector of the data storage unit of the data storage device according to another embodiment of the present invention.

Referring to FIG. 3, there is a schematic diagram of the data sector of the data storage unit of the data storage device according to another embodiment of the present invention, and with further reference to FIG. 1. As shown in FIG. 1 and FIG. 3, the second system storage sector 139 further comprises a second initial sector address 1391, and the data sector of the second initial sector address 1391 has another MBR 1392. The firmware 111 of the controller 11 further defines a boot pointer offset procedure 1113.

If the original operating system 132 damages and therefore cannot boot smoothly, the firmware 111 of the controller 11 will execute the boot pointer offset procedure 1113 to offset the boot pointer 130 from pointing to the first initial sector address 1311 of the first system storage sector 131 to pointing to the second initial sector address 1391 of the second system storage sector 139, and set the second initial sector address 1391 as the master boot sector address (LBA 0).

When the boot pointer 130 is offset from pointing to the first initial sector address 1311 of the first system storage sector 131 to pointing to the second initial sector address 1391 of the second system storage sector 139, the firmware 111 of the controller 11 converts the state of the first system storage sector 131 from the display state to the hidden state, and converts the state of the second system storage sector 139 from the hidden state to the display state, that is, the first system storage sector 131 is converted as a reserved space that cannot be operated by the user using the operating system or BIOS, and the second system storage sector 139 is converted as a storage space that can be accessed normally. Then, the firmware 111 of the controller 11 reads the master boot record 1392 from the second initial sector address 1391 of the second system storage sector 139, and executes the boot procedure of the first backup operating system 134 according to the master boot record 1392. After the first backup operating system 134 is normally booted, the electronic apparatus will perform operations according to the first backup operating system 134.

Accordingly, when the original operating system 132 damages, the firmware 111 of the controller 11 converts the execution of the boot operation from the original operating system 132 of the first system storage sector 131 to the first backup operating system 134 of the second system storage sector 139 by offsetting the boot pointer 130, such that the boot operation of the electronic apparatus can be restored quickly, and further the electronic apparatus may continue to execute operations by the use of the first backup operating system 134.

Figure 4:
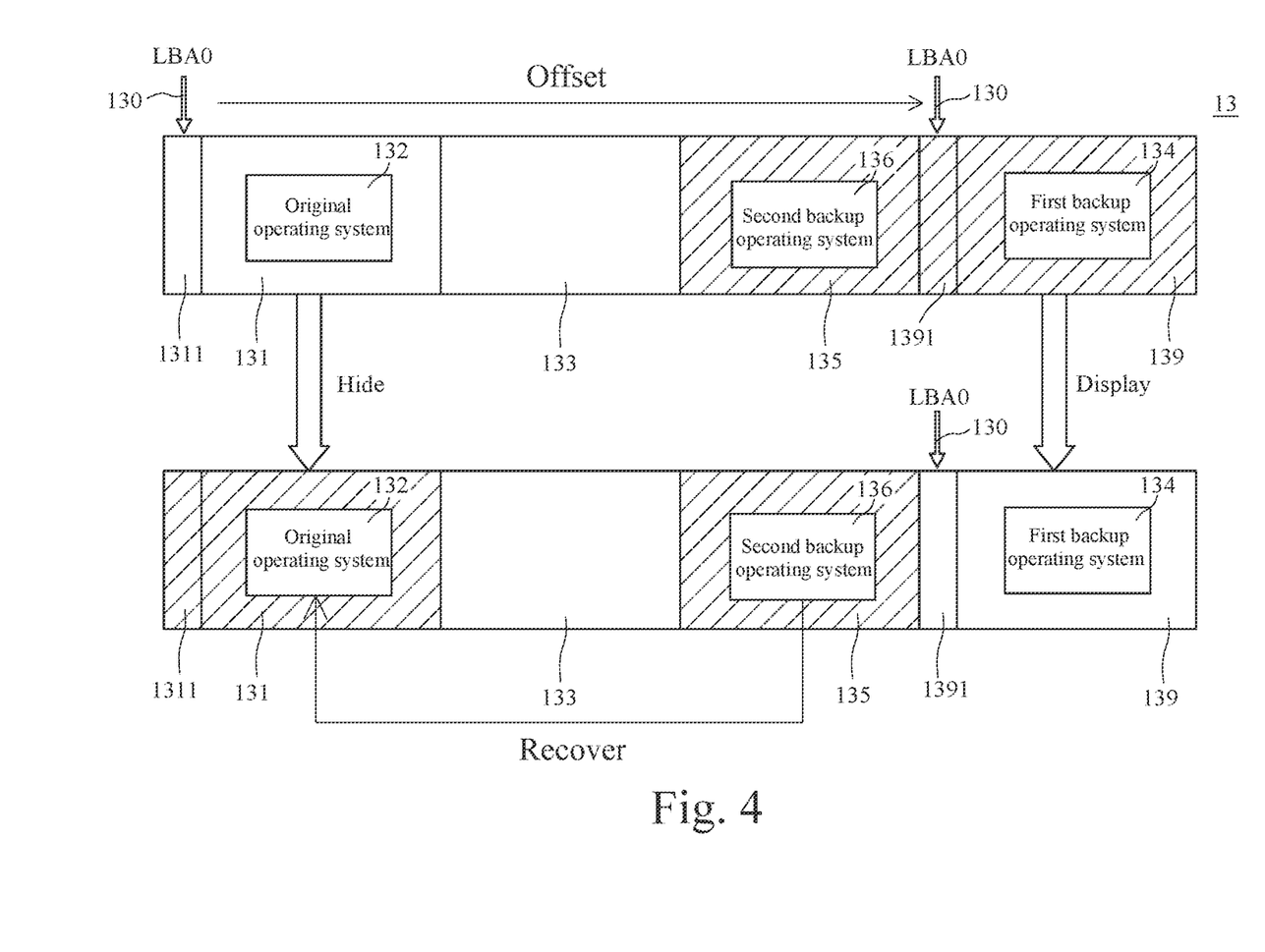
FIG. 4 is a schematic diagram of the data sector of the data storage unit of the data storage device according to another embodiment of the present invention.

Referring to FIG. 4, there is a schematic diagram of the data sector of the data storage unit of the data storage device according to another embodiment of the present invention, with further reference to FIG. 1. As shown in FIG. 1 and FIG. 4, a third system storage sector 135 is further divided from the data sectors of the data storage unit 13 by the firmware 111 of the controller 11. Similar to the second system storage sector 139, a state of the third system storage sector 135 is also preset as the hidden state by the firmware 111. The third system storage sector 135 is an over provisioning sector of the data storage unit 13, and unable to be accessed by the logical block address. Besides, the third system storage sector 135 stores a second backup operating system 136.

When the original operating system 132 is operating normally, the firmware 111 of the controller 11 enters the first system storage sector 131 of the data storage unit 13 according to the indication of the boot pointer 130, reads the master boot record 1312 from the first initial sector address 1311 of the first system storage sector 131, and executes the boot operation of the original operating system 132 by the master boot record 1312.

When the original operating system 132 damages and cannot boot smoothly, the firmware 111 of the controller 11 will execute the boot pointer offset procedure 1113 to offset the boot pointer 130 from pointing to the first initial sector address 1311 of the first system storage sector 131 to pointing to the second initial sector address 1391 of the second system storage sector 139, and set the second initial sector address 1391 as the master boot sector address (LBA 0). After the boot pointer 130 is offset from pointing to the first initial sector address 1311 of the first system storage sector 131 to pointing to the second initial sector address 1391 of the second system storage sector 139, the firmware 111 of the controller 11 converts the state of the first system storage sector 131 from the display state to the hidden state, and converts the second system storage sector 139 from the hidden state to the display state. Then, the firmware 111 of the controller 11 reads the master boot record 1392 from the second initial sector address 1391 of the second system storage sector 139, and executes the boot operation of the first backup operating system 134 by the master boot record 1392. When the first backup operating system 134 has booted and is operating, the firmware 111 of the controller 11 further executes the operating system recovery procedure 1111 to recover the original operating system 132 of the first system storage sector 131 by the use of the second backup operating system 136 of the third system storage sector 135. Accordingly, the electronic apparatus starts the next time, the firmware 111 of the controller 11 executes the boot operation by the recovered original operating system 132, and then executes the operations of the electronic apparatus by the recovered original operating system 132.

Again, referring to FIG. 1, in one embodiment of the present invention, the firmware 111 of the controller 11 can execute the operating system recovery procedure 1111 or the boot pointer offset procedure 1113 by a means of software triggering. The data storage device 100 of the present invention can be disposed inside the electronic apparatus, and electrically connected to a motherboard of the electronic apparatus. When an input and output system (BIOS) on the motherboard detects that the original operating system 132 of the data storage device 100 has damaged, it will issue a triggering command 150. After the firmware 111 of the controller 11 receives the triggering command 150 via the data transmission interface 15, it will execute the operating system recovery procedure 1111 or the boot pointer offset procedure 1113 according to the triggering command 150, such that the data storage device 100 can resume the normal boot operation, again.

In another embodiment of the present invention, the firmware 111 of the controller 11 can execute the operating system recovery procedure 1111 or the boot pointer offset procedure 1113 by a means of hardware triggering. The input and output port 17 is connected to a button 171. When the user of the data storage device 100 knows that the original operating system 132 of the data storage device 100 has damaged, he can press the button 171 to trigger the input and output port 17, for example, when the input and output port 17 is triggered, it's signal level is a high level. Afterwards, the firmware 111 of the controller 11 executes the operating system recovery procedure 1111 or the boot pointer offset procedure 1113 according to the triggering of the input and output port 17, such that the data storage device 100 can resume the normal boot operation again.

Figure 5:
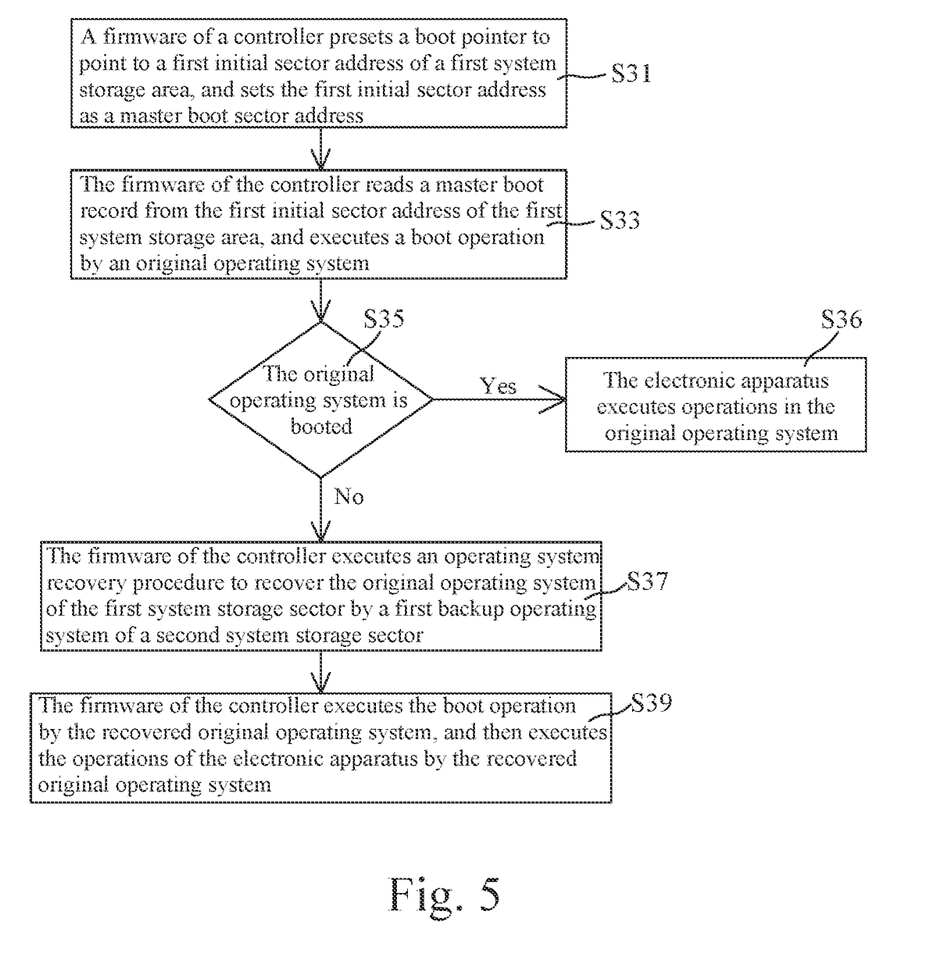
FIG. 5 is a flow chart of a method for maintaining a normal boot operation of the data storage device according to one embodiment of the present invention.

Referring to FIG. 5, there is a flow chart of a method for maintaining a normal boot operation of the data storage device according to one embodiment of the present invention, with simultaneous reference to FIG. 1 and FIG. 2. As shown in FIGS. 1 and 2, the data storage unit 13 of the data storage device 100 is divided into a first system storage sector 131, a data storage sector 133, and a second system storage sector 139. A state of the first system storage sector 131 is preset as a display state by the firmware 111 of the controller 11, and stores an original operating system 132. The second system storage sector 139 is an over provisioning sector of the data storage unit 13, and stores a first backup operating system 134. The state of the second system storage sector 139 is preset as a hidden state by the firmware 111 of the controller 11. Furthermore, the first system storage sector 131 comprises a first initial sector address 1311 having a master boot record 1312.

As shown in FIG. 5, in step S31, firstly, the firmware 11 of the controller 11 presets a boot pointer 130 to point to the first initial sector address 1311 of the first system storage sector 131, and sets the first initial sector address 1311 as a master boot sector address. In step S33, when the electronic apparatus starts, the firmware 111 of the controller 11 reads the master boot record 1312 from the first initial sector address 1311 of the first system storage sector 131, and executes the boot operation according to the original operating system 132 in the first system storage sector 131.

In step S35, if the original operating system 132 is successfully booted, continuing to perform step S36, the electronic apparatus executes operations in the operating environment the original operating system 132; on the contrary, if the original operating system 132 fails to boot, continuing to perform step S37, the firmware 111 of the controller 11 executes the operating system recovery procedure 1111 to read the first backup operating system 134 from the second system storage sector in the hidden state, and recover the original operating system 132 in the first system storage sector 131 by the use of the first backup operating system 134. In step S39, finally, when the electronic apparatus starts the next time, the firmware 111 of the controller 11 executes the boot operation by the recovered original operating system 132, and then executes the operations of the electronic apparatus by the recovered original operating system 132.

Figure 6:
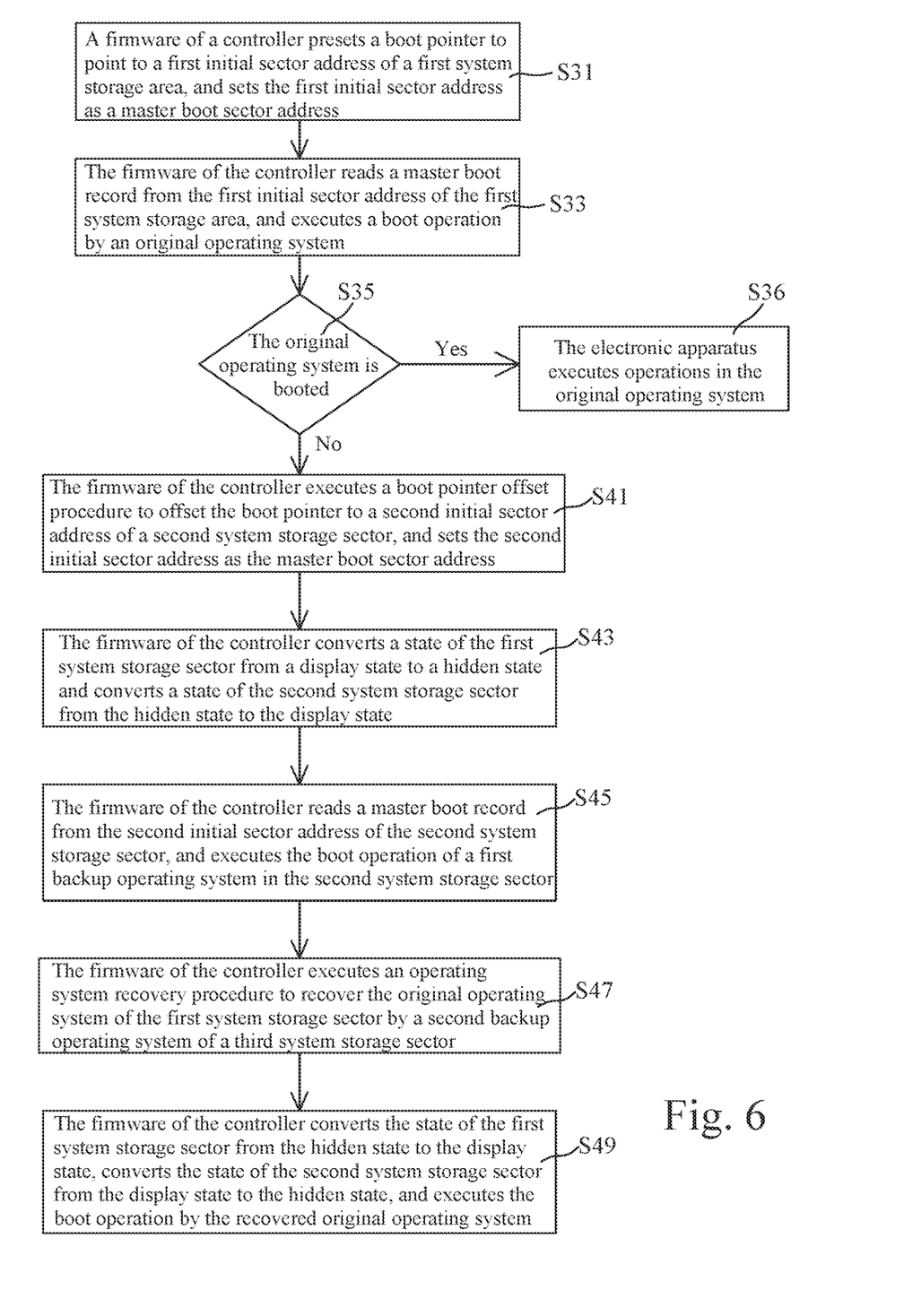
FIG. 6 is a flow chart of a method for maintaining the normal boot operation of the data storage device according to another embodiment of the present invention.

Referring to FIG. 6, there is a flow chart of a method for maintaining the normal boot operation of the data storage device according to another embodiment of the present invention, with simultaneous reference to FIGS. 1 and 2. Firstly, steps S31 to S36 in the embodiment of FIG. 6 are same as the steps S31 to S36 in the embodiment of FIG. 5. Furthermore, the second system storage sector 139 comprises a second initial sector address 1392 having a master boot record 1392.

In step S35, if the original operating system 132 fails to boot, continuing to perform step S41, the firmware 111 of the controller 11 executes a boot pointer offset procedure 1113 to offset the boot pointer 130 from pointing to the first initial sector address 1311 of the first system storage sector 131 to pointing to the second initial sector address 1331 of the second system storage sector 133, and sets the second initial sector address 1391 as the master boot sector address. In step S43, the firmware 111 of the controller 11 converts the state of the first system storage sector 131 from the display state to the hidden state, and converts the state of the second system storage sector 139 from the hidden state to the display state. In step S45, the firmware 111 of the controller 11 reads the master boot record 1392 from the second initial sector address 1391 of the second system storage sector 139, and executes the boot operation by the first backup operating system 134 of the second system storage sector 139. After the electronic apparatus has booted by the first backup operating system 134, it will perform operations in the operating environment of the first backup operating system 134.

Referring to FIG. 4, in another embodiment of the present invention, the data storage unit 13 of the data storage device 100 further comprises a third system storage sector 135. The third system storage sector 135 is also the over provisioning sector of the data storage unit 13, and stores a second backup operating system 136. A state of the third system storage sector 135 is preset as a hidden state by the firmware 111 of the controller 11.

In step S47, during the operation of the first backup operating system 134, the firmware 111 of the controller 11 executes the operating system recovery procedure 1111 to read the second backup operating system 136 of the third system storage sector 135, and recover the original operating system 132 of the first system storage sector 131 by the second backup operating system 136. In step S49, finally, when the electronic apparatus starts the next time, the firmware 111 of the controller 11 converts the state of the first system storage sector 131 from the hidden state to the display state and converts the state of the second system storage sector 139 from the display state to the hidden state, executes the boot operation by the recovered original operating system 132, and then executes the operations of the electronic apparatus by the recovered original operating system 132.

The above disclosure is only the preferred embodiment of the present invention, and not used for limiting the scope of the present invention. All equivalent variations and modifications on the basis of shapes, structures, features and spirits described in claims of the present invention should be included in the claims of the present invention.

What is claimed is:

1. A data storage device, applied to an electronic apparatus, comprising:
   a controller comprising a firmware; and
   a data storage unit connected to the controller, the data storage unit comprising:
      a first system storage sector, used to store an original operating system, and comprising a first initial sector address, wherein a state of the first system storage sector is preset as a display state by the firmware; and
      a second system storage sector, used to store a first backup operating system, and comprising a second initial sector address, wherein the second system storage sector is a first over provisioning sector of the data storage unit, and a state of the second system storage sector is preset as a hidden state by the firmware;
   wherein when the original operating system is normal, a boot pointer is set by the firmware to point to the first initial sector address of the first system storage sector, the original operating system executes a boot operation, and then the electronic apparatus will perform system operations by the original operating system after the original operating system has booted; when the original operating system damages, the firmware of the controller converts the state of the first system storage sector from the display state to the hidden state, converts the state of the second system storage sector from the hidden state to the display state, offsets the boot pointer from pointing to the first initial sector address to pointing to the second initial sector address, and executes the boot operation by the first backup operating system; the electronic apparatus will continue to perform system operations by the first backup operating system after the first backup operating system has booted.

2. The data storage device according to claim 1, wherein the data storage device further comprises a data transmission interface connected to the controller; when the controller receives a triggering command via the data transmission interface, the firmware of the controller executes a boot pointer offset procedure to offset the boot pointer from pointing to the first initial sector address to pointing to the second initial sector address.

3. The data storage device according to claim 1, wherein the controller is connected to an input and output port; when the input and output port is triggered, the firmware of the controller executes a boot pointer offset procedure to offset the boot pointer from pointing to the first initial sector address to pointing to the second initial sector address.

4. The data storage device according to claim 1, wherein the data storage unit further comprises a third system storage sector that is a second over provisioning sector of the data storage unit, and stores a second backup operating system; a state of third system storage sector is preset as the hidden state by the firmware; when the first backup operating system finishes the boot operation and operates normally, the firmware of the controller recovers the original operating system in the first system storage sector by the second backup operating system in the hidden third system storage sector.

5. A method for maintaining normal boot operation of data storage device, wherein the data storage device is applied to an electronic apparatus, and comprises a data storage unit and a controller; the controller comprises a firmware; the data storage unit comprises a first system storage sector and a second system storage sector; the first system storage sector stores an original operating system and comprises a first initial sector address; the second system storage sector is a first over provisioning sector of the data storage unit, stores a first backup operating system, and comprises a second initial sector address; a state of the first system storage sector is preset as a display state by the firmware of the controller, and a state of the second system storage sector is preset as a hidden state by the firmware of the controller; the method executed by the firmware of the controller comprising:
  presetting a boot pointer to point to a first initial sector address of the first system storage sector to execute a boot operation via the original operating system in the first system storage sector;
  requiring the electronic apparatus to perform system operations by the original operating system after the original operating system has booted;
  offsetting the boot pointer from pointing to the first initial sector address to pointing to the second initial sector address when the original operating system damages;
  converting the state of the first system storage sector from the display state to the hidden state and converting the state of the second system storage sector from the hidden state to the display state;
  reading a master boot record from the second initial sector address of the second system storage sector;
  executing the boot operation by the first backup operating system according to the master boot record read from the second initial sector address of the second system storage sector; and
  requiring the electronic apparatus to perform system operations by the first backup operating system after the first backup operating system has booted.

6. The method according to claim 5, wherein the data storage unit further comprises a third system storage sector that is a second over provisioning sector of the data storage unit, and stores a second backup operating system; a state of the third system storage sector is preset as the hidden state by the firmware; when the first backup operating system finishes the boot operation and operates normally, the method executed by the firmware of the controller further comprising:
  recovering the original operating system in the first system storage sector by the second backup operating system in the hidden third system storage sector.

\* \* \* \* \*